United States Patent Office 3,198,808
Patented Aug. 3, 1965

3,198,808
PRODUCTION OF PYRROLIDONE
Walter Himmele, Walldorf, and Nikolaus von Kutepow, Karlsruhe-Rueppurr, Germany, assignors to Badische Anilin- & Soda-Fabrik Aktiengesellschaft, Ludwigshafen (Rhine), Germany
No Drawing. Filed Oct. 25, 1962, Ser. No. 233,127
Claims priority, application Germany, Oct. 28, 1961, B 64,578; Nov. 3, 1961, B 64,646
6 Claims. (Cl. 260—326.5)

This invention relates to a process for the production of pyrrolidone.

It is known that lactams can be obtained by the reaction of ammonia and dicarboxylic acids capable of lactam formation, with hydrogen in the gas phase in the presence of hydrogenating and dehydrating catalysts, such as nickel phosphate, cobalt phosphate, nickel borate or cobalt borate. When working by this method, however, large amounts of nitriles and cyclic imines are obtained at the same time. The yield of lactams is up to 55% of the theory.

It is also known that lactams can be prepared by hydrogenation of diamides of the said type of dicarboxylic acids in the liquid phase with relatively low conversions in the presence of Raney nickel or Raney cobalt as catalysts at elevated temperature and increased pressure. In this method dehydrating catalysts must not be present. Furthermore the reaction must be carried out in the presence of organic solvents, because the water produced by the reaction saponifies the diamide and disturbs further hydrogenation of the diamide.

Moreover it is known that succinimide can be converted to pyrrolidone with hydrogen in organic solvents, for example dioxane or cycloparaffins, in the presence of nickel or cobalt supported on diatomaceous earth as catalysts. Butyrolactone is formed as a byproduct in this process.

While it is possible by the first-mentioned method to prepare pyrrolidone direct from succinic acid, it is necessary for the other two methods, by which better yields of pyrrolidone are obtained, to use a derivative of succinic acid. Losses occur both in the preparation of the diamide of succinic acid and of succinimide, so that the yields of pyrrolidone, with reference to initial acid, are poor.

It is an object of this invention to provide a process for preparing pyrrolidone in a more efficient manner than hitherto and with good yields.

This and other objects and advantages of the invention are achieved by reacting a compound of the Formula I:

HOOC—A—COOH with ammonia and hydrogen in the liquid phase at elevated temperature and increased pressure in the presence of cobalt, nickel, copper and/or iron as catalyst, said catalyst being sintered. In the Formula I, A represents —CH$_2$—CH$_2$— or —CH=CH—.

Cobalt, nickel, copper or iron may be used as catalyst. Mixtures or alloys of two, three or all of these metals may also be used. There is no criticality in the relative proportions in which the metals are used. Two or more metals may be present in similar quantities, for example, in the ratios by weight of 1:1 or 1:1:1:2. On the other hand, one, two or three of these metals may be present only in traces, for example, 0.05 to 5% by weight of the catalyst. The catalysts may also contain manganese, silver or chromium, either singly or in admixture with each other. These substances may be present in amounts of for example about 1 to 30% by weight of the catalyst. In many cases, 1 to 5% by weight is sufficient. However, the said components may likewise be present in larger amounts, for example, in a total amount of 20 to 30% by weight.

The catalyst may be supported on carrier material such as pumice, clay or silicates. The carrier material may amount to about 50 to 95% by weight of the supported catalyst, i.e., metal and carrier. The catalysts may be prepared for example by sintering the individual powdered metals, if desired together with the carrier material, at temperatures which are advantageously only slightly below, for example 20° to 80° C. below, the melting point of the metal employed. When the metals are used in admixture, it is advantageous to choose a temperature which is about 20° to 80° C. below the temperature at which the metal having the lowest melting point begins to melt. When alloys are used, it is advantageous to sinter them at temperatures which are about 20° to 80° C. below the melting point of the alloy concerned.

Particularly active catalysts are obtained by starting from oxygen compounds of the said metals. The oxides of the said metals, or other oxygen compounds thereof which are converted into the oxides at the sintering temperature at the latest, such as hydroxides, carbonates, nitrates or nitrites, are heated to temperatures above 600° C., advantageously above 800° C., preferably in the presence of atmospheric oxygen. Although the initial materials for the production of the catalysts may be heated up to the melting point, it is preferred in general to choose a temperature which is about 20° to 100° C. below the melting point of the metal compound in question. Especially preferred catalysts are obtained by sintering at temperatures between 1,000° C. and about 20° C. below the melting point of the metal compounds employed. The above-mentioned carrier material, if used, may be incorporated during the production of the initial material which has not yet been sintered or may be added to the readymade initial material prior to sintering.

The duration of the sintering depends on the temperature chosen. In general, it is at least half an hour and advantageously one to five hours. The sintered oxides are then treated at temperatures between 150° and 600° C., advantageously between about 250° and 400° C., with hydrogen until the oxide has been practically completely reduced to metal. It is advantageous to carry out the reduction in the reaction vessel in which the hydrogenation is to be carried out, so that the catalyst does not come into contact with atmospheric oxygen.

In the production of pyrrolidone it is convenient to work at temperatures between 150° and 280° C., advantageously between 170° and 250° C., particularly between 190° and 230° C. If the reaction is carried out at lower temperatures, the reaction speed is decreased. On the other hand, if higher temperatures are used, cyclic imines may be formed as byproducts, so that the yield of pyrrolidone is decreased. As a rule, hydrogen pressures of 20 to 400 atmospheres, preferably between 45 and 250 atmospheres, are applied. However, it is also possible to use higher hydrogen pressures, for example 500 atmospheres. In every case, the temperature and pressure must be correlated in such a way that a liquid reaction medium is formed. This is an essential feature of the invention.

The hydrogen may be diluted with gases which are inert under the reaction conditions, for example with nitrogen or saturated hydrocarbons, such as methane or ethane.

Suitable starting compounds I include succinic acid, maleic acid and fumaric acid.

It is advantageous to employ ammonia in a quantity of at least one mole for each mole of starting compound I. The best results are achieved by using ammonia in excess, for example in a 5 to 20 molar excess. The ammonia may be added in gaseous, liquid or dissolved form. Suitable solvents for ammonia include water and inert organic solvents, such as cyclic ethers, for example dioxane or tetrahydrofurane or pyrrolidone. Even if liquid or gaseous ammonia is used for the reaction it is advantageous to carry out the reaction in the presence of water and/or any of the solvents mentioned. It is usual to work in the presence of 60 to 90% by weight of water and/or organic solvent, with reference to the whole of the initial material I.

Instead of using ammonia in gaseous, liquid or dissolved form it is possible to introduce it combined with the starting material I, for example as a neutral or acid ammonium salt, monoamide of succinic or maleic acid (obtainable from the anhydrides and ammonia, if desired in the reaction mixture) or the ammonium salts thereof, or as maleic or fumaric acid diamide. In this case, too, additional employment of free ammonia is recommended.

The reaction is advantageously carried out by adding the initial material I and, if desired, water and/or another solvent to the catalyst in a pressure vessel, adding any ammonia to be added in gaseous, liquid or dissolved form, and then forcing in hydrogen. The mixture is maintained at the reaction temperature for some time, e.g., 5 to 25 hours.

Pyrrolidone may be separated from the reaction mixture in a simple way, for example by filtering off the catalyst and if necessary distilling off the solvent. Pyrrolidone can be obtained particularly pure by distillation.

The reaction may be carried out batchwise or continuously.

The main advantage of the process according to the present invention is that it is possible to start from aqueous initial materials and that removal of the water formed during the reaction is unnecessary because the catalysts are not sensitive to water.

It is moreover surprising that the catalyst used in the reaction is so selective in its hydrogenating action that pyrrolidone alone is formed, and not also pyrrolidine, such as is the case for example when using Raney nickel or Raney cobalt.

The invention is illustrated by, but not limited to, the following examples in which parts are by weight unless otherwise specified; parts by weight bear the same relation to parts by volume as the g. to the ml.

EXAMPLE 1

300 parts of cobalt sinter oxide, which has been brought into pellet form by sintering at 1050° C. is charged into a rotating autoclave having a lining of alloy stable to carboxylic acid. Pressure-tight closure of the autoclave is effected and the latter flushed with nitrogen. The cold autoclave is pressured to 100 atmospheres of hydrogen and then heated up to 280° C. When this temperature has been reached, the hydrogen pressure is raised to 250 atmospheres. The pressure falls to 210 atmospheres in the course of six hours. Reduction of the sinter oxide to metal is by then completed. After the autoclave has been cooled, it is depressured and flushed with nitrogen.

800 parts of diammonium succinate containing 11% of water is then introduced into the autoclave charged with the pretreated catalyst. The autoclave is rinsed with nitrogen. Then at room temperature, 50 atmospheres of hydrogen is forced in and the autoclave heated to 200° C. The hydrogen pressure is kept at 210 atmospheres as constantly as possible for eighteen hours. This is achieved by forcing in further hydrogen. After the said eighteen hours, practically no further absorption of hydrogen occurs. The experiment is discontinued after twenty-four hours. The product is water white. It is then distilled and, after a first runnings, 327 parts of 99.9% pyrrolidone (B.P. 140° to 141° C. at 22 mm. Hg) and 8 parts of 78.7% pyrrolidone (B.P. 135° to 140° C. at 22 mm. Hg) are obtained. A total of 333 parts of pyrrolidone is obtained, i.e., 83.5% of the theory with reference to the diammonium succinate used. The distillation residue (59 parts) may be returned to the autoclave. The first runnings of the distillation is mainly water containing traces of pyrrolidone in addition to ammonia.

EXAMPLE 2

500 parts of succinic acid and 360 parts of 25% aqueous ammonia solution are reacted in the presence of the catalyst described in Example 1 at a temperature of 200° to 210° C. and a hydrogen pressure of 170 atmospheres. By distillation of the product, a first runnings of 265 parts is obtained which consists of water containing traces of pyrrolidone, a fraction of 86 parts having the boiling point up to 135° C. at 18 mm. Hg, consisting to the extent of 90% of pyrrolidone, and a main fraction of 204 parts consisting of 99.7% pyrrolidone having a boiling point of 135° to 137° C. at 18 mm. Hg. The yield of pyrrolidone is 78.2% of the theory with reference to the succinic acid used.

EXAMPLE 3

By using a cobalt catalyst which has been prepared as described in Example 1 and has already been used eleven times before for a reaction of succinic acid and aqueous ammonia, there is obtained from the initial materials specified in Example 2 (500 parts of succinic acid and 360 parts of 25% aqueous ammonia solution), by working up the product, 278 parts of pyrrolidone, i.e., a yield of 77.2% of the theory.

EXAMPLE 4

300 parts of a cobalt catalyst which has been prepared as described in Example 1 and has already been used three times for the reaction of succinic acid and aqueous ammonia solution is used for the reaction of 690 parts of moist amide-ammonium salt of succinic acid (water content 16%). 293 parts of 99.2% pyrrolidone is obtained by working up the reaction mixture. The yield is 79% of the theory with reference to the initial material.

EXAMPLE 5

300 parts of sintered nickel oxide is reduced in an autoclave at 350° C. under a hydrogen pressure of 250 atmospheres for six hours. After the autoclave has been cooled, it is depressured and rinsed with nitrogen. Then 800 parts of dry diammonium succinate is introduced, 250 atmospheres of hydrogen is forced in and the whole heated for three hours at 190° C. Then heating is carried out for three hour periods at 200°, 210°, 220° and 230° C., the hydrogen pressure being readjusted to 250 atmospheres prior to each reheating. The autoclave is then cooled and the product fractionally distilled. After a first runnings of 20 parts, 282 parts of 98.8% pyrrolidone having the boiling point 135° to 138° C. at 22 mm. Hg and 149 parts of residue are obtained, the residue being returned to the atuoclave, if desired. The yield is 75.9% of the theory with reference to reacted initial material.

EXAMPLE 6

A cobalt sinter oxide catalyst which has been shaped into small pellets is introduced into a three liter high pressure reactor lined with alloy steel. The reactor is closed, rinsed with nitrogen and the nitrogen then expelled with hydrogen. After the reactor has been heated to 300° C., a stream of 500 liters per hour of hydrogen is led through the reactor at atmospheric pressure. After six hours, the pressure is slowly increased until after thirty-six hours the pressure prevailing in the reactor is 250 atmospheres. To effect complete reduction of the catalyst, the pressure is kept at 250 atmospheres for another twenty-four hours. Then 500 parts of distilled water per hour is supplied at 200° C. to one end of the high pressure reactor by means of a pump. Supply of water is discontinued after four hours, and instead 300 parts of a solution consisting of 30% by weight of diammonium succinate and 25% aqueous amomnia solution is supplied per hour. At the other end of the reactor, 280 liters of hydrogen and gaseous reaction mixture is removed per hour and cooled to 20° C. in a cooling system. 1,704 parts of condensation product is obtained in six hours.

By fractional distillation, 159 parts of 99% pyrrolidone is obtained together with a residue of 137 parts which may be returned to the reactor. The yield of pyrrolidone is 74.8% of the theory with reference to reacted initial material.

EXAMPLE 7

300 parts of cobalt sinter oxide is charged into a 2.6 liter rotating autoclave having an alloy steel lining. Pressure-tight closure of the autoclave is effected and the autoclave is rinsed three times with nitrogen. The cold autoclave is pressured to 100 atmospheres of hydrogen and then heated to 300° C. After this temperature has been reached, a pressure of 280 atmospheres is set up in the autoclave by forcing in more hydrogen. The pressure falls to about 250 atmospheres in the course of six hours, during which time the sinter oxide is substantially reduced to metal. After the autoclave has cooled down, it is depressured and rinsed with nitrogen.

The autoclave is evacuated and then a solution of 500 parts of maleic acid in 360 parts of 25% aqueous ammonia solution is sucked into the autoclave. To expel any air which may have been also sucked in, the cold autoclave is rinsed again with nitrogen and hydrogen is forced in until the pressure is 250 atmospheres.

To effect hydrogenation of the ammonium salt of maleic acid, the cold autoclave is set in motion for a short time and then heated to 200° C., the pressure being kept at 250 atmospheres for eight hours by forcing in further hydrogen at hourly intervals. After the autoclave has cooled down, the discharge (685 parts) is distilled. 202 parts of pure pyrrolidone (56% of the theory with reference to maleic acid used) is obtained. The residue (170 parts) still contains ammonium salt of maleic acid which may be used again for a further reaction.

EXAMPLE 8

A cobalt sinter oxide catalyst which has been shaped into small pellets is charged into a high pressure reactor (internal width 44 mm.; length 2,000 mm.) lined with alloy steel. The reactor is closed, rinsed with nitrogen and then the nitrogen expelled by means of hydrogen. After heating the reactor to 300° C., a stream of 500,000 parts by volume of hydrogen is passed per hour through the reactor, at first without using increased pressure. After six hours, the pressure is slowly increased until after thirty-six hours the pressure prevailing in the reactor is 250 atmospheres. The autoclave is kept at this pressure for another twenty-four hours to complete the reduction of the catalyst. The temperature is then lowered to 200° C. and the pressure kept at 250 atmospheres by forcing in more hydrogen. 500 parts of distilled water is supplied per hour to the reactor by means of a pump. The water is then slowly displaced by a 20% solution of the ammonium salt of maleic acid in 25% aqueous ammonia solution. Gassing of the contents of the reactor is effected by removing per hour 100,000 parts by volume of hydrogen at the top of the vertical reactor, the hydrogen being introduced into the reaction system at the lower end of the reactor. After steady-state conditions have been reached, 200 parts of the said solution is supplied to the system per hour. The discharge from the reactor is 1009 parts after five hours. It is worked up by fractional distillation. 127 parts of a 97% pyrrolidone is thus obtained. This is a yield of 82.5% of the theory with reference to the ammonium salt of maleic acid used.

EXAMPLE 9

The procedure of Example 8 is followed but 300 parts per hour of a 20% solution of the ammonium-amide salt of maleic acid in 25% aqueous ammonia solution is used instead of 200 parts per hour of a 20% solution of ammonium maleate in 25% aqueous ammonia solution. After a reaction period of six hours, a reactor discharge of 1,800 parts is obtained. By fractional distillation, 195 parts of 99% pyrrolidone is obtained and a residue of 44 parts which is added to fresh initial mixture. The yield of pyrrolidone is 89.5% of the theory with reference to reacted initial material.

EXAMPLE 10

The procedure of Example 8 is followed but 360 parts per hour of a 10% solution of the diammonium salt of fumaric acid is used. After a reaction period of sixteen hours, the reactor discharge is 5,785 parts. The water is removed under a water jet pump vacuum and the residue (380 parts) fractionally distilled at 0.6 mm. Hg. 288 parts of a 97.5% pyrrolidone is obtained and 72 parts of residue which is returned to the reaction. The yield is 90.0% of the theory with reference to reacted initial material.

EXAMPLE 11

A cobalt sinter oxide catalyst which has been shaped into small pellets is charged into a high pressure reactor (internal width 44 mm., length 2,000 mm.) lined with alloy steel. The reactor is closed, rinsed with nitrogen and then the nitrogen expelled by means of hydrogen. After the reactor has been heated up to 200° C., a stream of 200,000 parts by volume of hydrogen is passed through per hour at atmospheric pressure. After six hours, the pressure is slowly raised until after thirty-six hours a pressure of 250 atmospheres prevails in the reactor. This pressure is maintained for another twenty-four hours to complete the reduction of the catalyst. The temperature is then lowered to 200° C. and the pressure kept at 250 atmospheres by forcing in further hydrogen. 500 parts of distilled water is supplied to the reactor per hour by means of a pump. The water is then slowly expelled by a 20% solution of the ammonium salt of maleic acid in 25% aqueous ammonia solution. Gassing of the contents of the reactor is effected by an hourly removal of 100,000 parts by volume of hydrogen from the top of the vertical reactor, while hydrogen is introduced into the reaction system at the bottom of the reactor. After steady-state conditions have been reached, 150 parts of the said solution is supplied per hours to the system. The discharge from the reactor is 3,780 parts after twenty-four hours. It is worked up by fractional distillation. 127 parts of a 97% pyrrolidone is obtained, i.e. 81.2% of the theory with reference to ammonium maleate used.

EXAMPLE 12

*Production of the catalyst*

350 parts of cobalt oxide prepared by igniting cobalt carbonate at 450° C. and 35 parts of cobalt oxide which has been heated to 1000° C. and finely ground are kneaded in a rotary dryer with 20 parts of 40% nitric acid and such an amount of water than an extrudable composition is formed which is then shaped to 4 mm. pellets in a hydraulic press. The pellets are dried in a drying cabinet at 110° C. and heated in a muffle furnace at 450° C. for six hours. The granules thus obtained are impregnated with a 50% solution of manganese acetate in water, the amount being regulated so that the finished catalyst contains 3% by weight of manganese as oxide. The catalyst is dried, introduced into a high temperature reactor and heated at 1000° C. for an hour at full capacity. The catalyst is slowly cooled and graded. Its bulk density is 2120 g./l.

The above catalyst is charged into a high pressure reactor (internal width 44 mm.; length 2,000 mm.) lined with alloy steel. The reactor is closed, rinsed with nitrogen and the nitrogen then expelled by means of hydrogen. After the reactor has been heated up to 200° C., a stream of 200,000 parts by volume of hydrogen per hour is passed through the reactor at atmospheric for 24 hours' pressure. While maintaining the temperature, 500 parts of distilled water per hour is supplied to the reactor by means of a pump. The water is then slowly expelled by a 20% solution of the ammonium salt of maleic acid in 25% aqueous ammonia solution. Hydrogen is supplied to the bottom of the reactor at a pressure of 250 atmospheres while 100,000 parts by volume of hydrogen is removed per hour at the top. After steady-state conditions have been reached, 450 parts per hour of the said solution is supplied to the system. The discharge from the reactor is 11,650 parts after twenty-four hours. 866 parts thereof are fractionally distilled. 92.5 parts of a 97% pyrrolidone is recovered, i.e. a yield of 91.6% of the theory with reference to the ammnium salt of maleic acid used.

EXAMPLE 13

A catalyst which contains 36.2% by weight of cobalt, calculated as cobalt oxide, on pumice as support is reduced at a temperature of 300° C. and at a hydrogen pressure of 250 atmospheres in the apparatus described in Example 1. 800 parts of a 20% solution of the amide-ammonium salt of maleic acid in 25% aqueous ammonia solution, is introduced within twenty hours. The discharge from the reactor is 740 parts after twenty hours. It is worked up by fractional distillation. 65.5 parts of 91% pyrrolidone (63% of the theory) is obtained.

We claim:

1. A process for the production of pyrrolidone which comprises contacting a compound of the formula

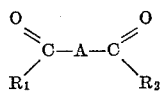

wherein A represents a member selected from the group consisting of —$CH_2$—$CH_2$ and —CH=CH— and $R_1$ and $R_2$ each denotes a member from the group consisting of —OH, —$NH_2$ and —$ONH_4$, with ammonia and hydrogen in the liquid phase at elevated temperature and increased pressure in the presence of a catalyst selected from the class consisting of cobalt, nickel and mixtures thereof, said catalyst having been sintered at a temperature between above 600° C. and 20 to 100° C. below its melting point and reduced with hydrogen at a temperature between 150° and 600° C.

2. A process as claimed in claim 1 wherein said compound is succinic acid.

3. A process as claimed in claim 1 wherein said compound is maleic acid.

4. A process as claimed in claim 1 wherein said compound is diammonium succinate.

5. A process as claimed in claim 1 wherein said compound is the monoammonium salt of maleic acid mono-amide.

6. A process for the production of pyrrolidone which comprises contacting a compound of the formula

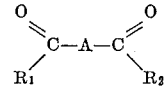

wherein A represents a member selected from the group consisting of —$CH_2$—$CH_2$ and CH=CH— and $R_1$ and $R_2$ each denotes a member from the group consisting of —OH, —$NH_2$ and —$ONH_4$, with ammonia and hydrogen in the liquid phase at elevated temperature and increased pressure in the presence of a catalyst selected from the class consisting of cobalt, nickel, and mixtures thereof, and said catalyst containing manganese from about 1% to 30% by weight of the catalyst, said catalyst having been sintered at a temperature between above 600° C. and 20 to 100° C. below its melting point and reduced with hydrogen at a temperature between 150° C. and 600° C.

References Cited by the Examiner

UNITED STATES PATENTS

| | | | |
|---|---|---|---|
| 2,187,745 | 1/40 | Lazier | 260—319 |
| 3,080,377 | 3/63 | Liao | 260—326.5 |
| 3,109,005 | 10/63 | Lidov | 260—326.5 |

NICHOLAS S. RIZZO, *Primary Examiner.*